United States Patent
Yu

(10) Patent No.: US 11,686,077 B2
(45) Date of Patent: Jun. 27, 2023

(54) PIPE UNCLOGGING DEVICE

(71) Applicant: Peihua Yu, Elmhurst, NY (US)

(72) Inventor: Peihua Yu, Elmhurst, NY (US)

(*) Notice: Subject to any disclaimer, the term of this patent is extended or adjusted under 35 U.S.C. 154(b) by 101 days.

(21) Appl. No.: 17/448,225

(22) Filed: Sep. 21, 2021

(65) Prior Publication Data

US 2022/0341140 A1 Oct. 27, 2022

Related U.S. Application Data

(60) Provisional application No. 63/201,381, filed on Apr. 27, 2021.

(51) Int. Cl.
  *E03C 1/308* (2006.01)
  *F16L 45/00* (2006.01)
  *E03F 9/00* (2006.01)

(52) U.S. Cl.
  CPC ............... *E03C 1/308* (2013.01); *E03F 9/00* (2013.01); *F16L 45/00* (2013.01)

(58) Field of Classification Search
  CPC ... E03F 9/00; E03F 9/002; E03F 9/007; E03F 9/027; E03F 9/032; F16L 45/00
  USPC ........................................................ 4/255.11
  See application file for complete search history.

(56) References Cited

U.S. PATENT DOCUMENTS

| | | | |
|---|---|---|---|
| 1,180,182 A | 4/1916 | Petersen | |
| 1,848,269 A | 3/1932 | Peersen | |
| 1,885,977 A * | 11/1932 | Denison | E03C 1/306 4/255.06 |
| 1,924,498 A * | 8/1933 | House | E03C 1/304 137/240 |
| 1,938,064 A * | 12/1933 | Carmine | E03C 1/304 4/255.06 |
| 2,753,876 A | 7/1956 | Kurt | |
| 3,075,535 A | 1/1963 | Lasting | |
| 3,714,951 A | 2/1973 | Lundman | |
| 3,792,708 A | 2/1974 | Tash | |
| 3,802,449 A | 4/1974 | Mulinex | |
| 4,073,302 A | 2/1978 | Jones | |
| 4,475,255 A | 10/1984 | Tash | |
| 4,672,988 A | 6/1987 | Tash | |
| 4,957,123 A | 9/1990 | McHugh | |
| 6,389,613 B1 | 5/2002 | Comas | |
| 6,427,458 B1 | 8/2002 | Fowler | |
| 6,899,138 B2 | 5/2005 | Lundman | |
| 7,107,634 B1 * | 9/2006 | Baird | E03C 1/28 4/256.1 |
| 7,863,885 B1 | 1/2011 | Olsson et al. | |
| 8,914,938 B1 | 12/2014 | Lee | |
| 9,157,227 B2 | 10/2015 | Savaria | |
| 9,725,894 B2 * | 8/2017 | Caux | E03D 11/00 |
| 10,280,601 B1 * | 5/2019 | Perez | E03C 1/22 |
| 10,975,555 B1 * | 4/2021 | Junca | E03C 1/304 |

(Continued)

*Primary Examiner* — Janie M Loeppke
(74) *Attorney, Agent, or Firm* — Dunlap Bennett & Ludwig, PLLC

(57) ABSTRACT

A pipe unclogging device and system are disclosed. The device allows a user to clear a blockage in a pipe downstream from the start of the pipe system quickly and easily. To do so, the device provides a pipe with a branch portion, with a plunger device operably coupled to the branch portion. In use, the plunger device is actuatable to plunge fluid in the pipe, or it can be removed to provide a user direct access to the pipe system for other unclogging tools, such as a plumbing snake.

7 Claims, 4 Drawing Sheets

(56) References Cited

U.S. PATENT DOCUMENTS

| | | | |
|---|---|---|---|
| 2005/0283890 A1* | 12/2005 | Schaaf | E03C 1/30 |
| | | | 4/255.01 |
| 2011/0005615 A1 | 1/2011 | Savara | |
| 2016/0083950 A1* | 3/2016 | Durkin | E03D 9/00 |
| | | | 4/431 |
| 2017/0051494 A1* | 2/2017 | Mainzer | E03F 9/005 |
| 2017/0366711 A1 | 12/2017 | Kessler | |
| 2018/0347162 A1* | 12/2018 | Sfredel | F16L 55/1152 |
| 2020/0340223 A1* | 10/2020 | Chambers | E03C 1/284 |

* cited by examiner

PIPE UNCLOGGING DEVICE

CROSS-REFERENCE TO RELATED APPLICATION

This application claims the benefit of priority of U.S. provisional application No. 63/201,381, filed Apr. 27, 2021, the contents of which are herein incorporated by reference.

BACKGROUND OF THE INVENTION

The present invention relates to sewer guards and, more particularly, to a novel pipe unclogging device as set forth in the following specification.

Many people have the experience of a clogged pipe/drain. When this occurs, until the clog is discovered, the pipes are left full of wastewater (or other fluids) from the start of the pipe to the point of blocking. In order to clear the pipes, the best way is to identify where the blockage point is, open a window (i.e., an access point along the pipes), and use various tools, like a snake, to dredge/clean the sewer/pipes.

Since the pipes are full of wastewater, if the window is open, the wastewater/fluid will flow out to anywhere without control, and users must wait a long time until the pipes are almost empty. The water is very often dirty and has a pungent odor, and after unclogging the pipes, still needs a lot of time to clean up. For that reason, many people try to unclog the pipes from the start of the pipes (rather than opening up a section of the pipes). If the clogged point is far away from that starting point, a very long snake is required, and can take a very long time to unclog.

As can be seen, there is a need for an improved device as described herein. The pipe unclogging device in accordance the present invention connects to the sewer system and, when the drain is clogged, the clog can be quickly identified and cleaned/dredged quickly and easily.

SUMMARY OF THE INVENTION

In one aspect of the present invention, a pipe unclogging device comprises: a pipe comprising a main body and a branch portion extending from the main body, the main body being configured to couple to a pipe system; a cover hingedly coupled to the pipe, the cover being rotatable between a first cover position wherein longitudinal fluid flow is obstructed through part of the main body, and a second cover position wherein longitudinal fluid flow is unobstructed through the main body; and a plunger device operably coupled to the branch portion and actuatable to plunge fluid in the pipe.

In another aspect of the present invention, a pipe unclogging system comprises: a pipe system; and a pipe unclogging device comprising: a pipe comprising a main body and a branch portion extending from the main body, the main body being coupled to the pipe system; a cover hingedly coupled to the pipe, the cover being rotatable between a first cover position wherein longitudinal fluid flow is obstructed through part of the main body, and a second cover position wherein longitudinal fluid flow is unobstructed through the main body; and a plunger device operably coupled to the branch portion and actuatable to plunge fluid in the pipe.

In yet another aspect of the present invention, a method of unclogging a pipe system includes the steps of: (1) providing a pipe unclogging device comprising: a pipe comprising a main body and a branch portion extending from the main body; a cover hingedly coupled to the pipe, the cover being rotatable between a first cover position wherein longitudinal fluid flow is obstructed through part of the main body, and a second cover position wherein longitudinal fluid flow is unobstructed through the main body; and a plunger device operably coupled to the branch portion; (2) coupling the main body a pipe system; and (3) actuating the plunger device to plunge fluid in the pipe. This method may also include the step of removing the plunger device to expose a conduit of the branch portion.

These and other features, aspects and advantages of the present invention will become better understood with reference to the following drawings, description, and claims.

BRIEF DESCRIPTION OF THE DRAWINGS

The following figures are included to illustrate certain aspects of the present disclosure and should not be viewed as exclusive embodiments. The subject matter disclosed is capable of considerable modifications, alterations, combinations, and equivalents in form and function, without departing from the scope of this disclosure.

DETAILED DESCRIPTION OF THE INVENTION

Figure 1:
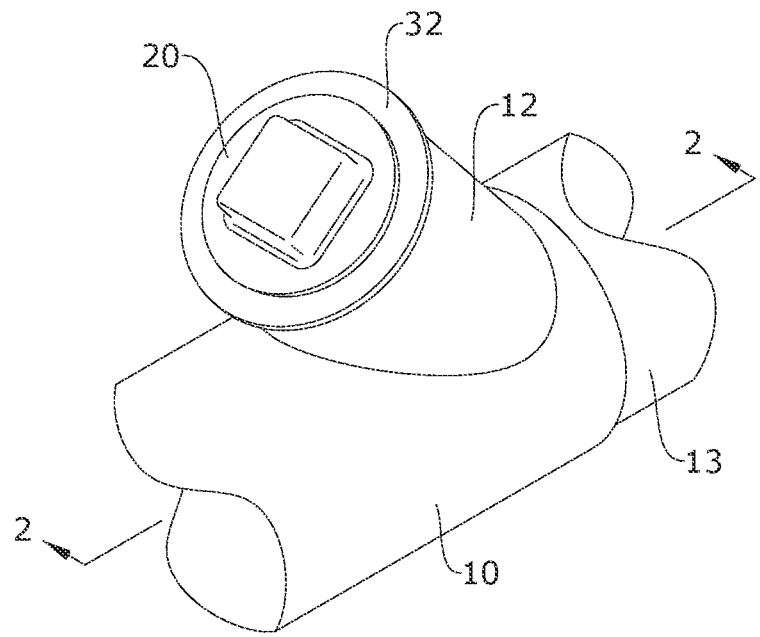
FIG. 1 is a perspective view of an embodiment of the present invention.

The subject disclosure is described with reference to the drawings, wherein like reference numerals are used to refer to like elements throughout. In the following description, for purposes of explanation, numerous specific details are set forth in order to provide a thorough understanding of the present disclosure such that one skilled in the art will be enabled to make and use the present invention. It may be evident, however, that the present disclosure may be practiced without some of these specific details.

Broadly, an embodiment of the present invention provides a pipe unclogging device. Embodiments of the present invention help to locate a blocked point on a sewer line, dredge the sewer, prevent back flow, and prevent wastewater from flowing out. Embodiments of the present invention are easy to use it, save time and money, and save water as well. Embodiments of the present invention also combines all the functions typically needed together.

Referring now to FIGS. 1-9, the pipe unclogging device includes a pipe that includes a pipe main body 10 functioning as a base to be built/integrated into a sewer or other pipe system, and the pipe may further include a branch portion 12 (also referred to as an upper extension portion) and a reduced diameter portion 13. As those will appreciate, in certain embodiments, the pipe main body 10 may run the entire length of the unclogging device (i.e., there is no reduced diameter portion 13). The structure of the main body 10 of the present invention resembles a "Y" shape tube, shown as FIG. 1. In a normal state (e.g., FIG. 2), the branch portion 12 may be covered by a plug 20 that is screwably coupled to a connecting pipe 32 (described in greater detail below). In certain embodiments, the pipe may be formed from a transparent material, and connect with the pipe system via left and right side distal portions (relative to the orientation shown in FIG. 2).

Figure 2:
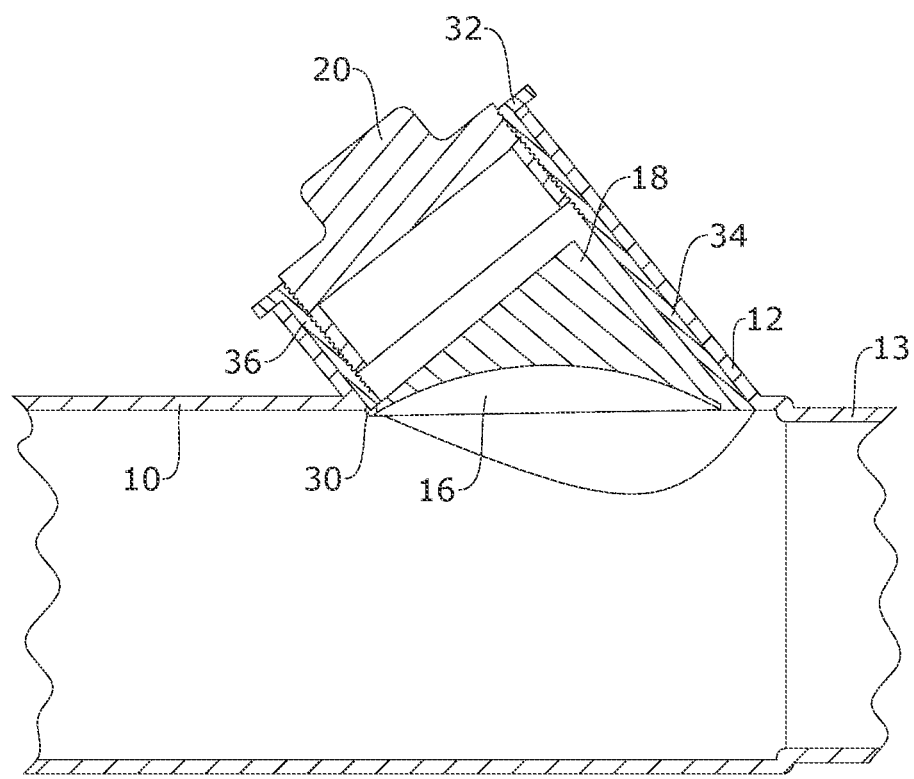
FIG. 2 is a section view of the embodiment of the present invention, taken along line 2-2 in FIG. 1.
Figure 8:
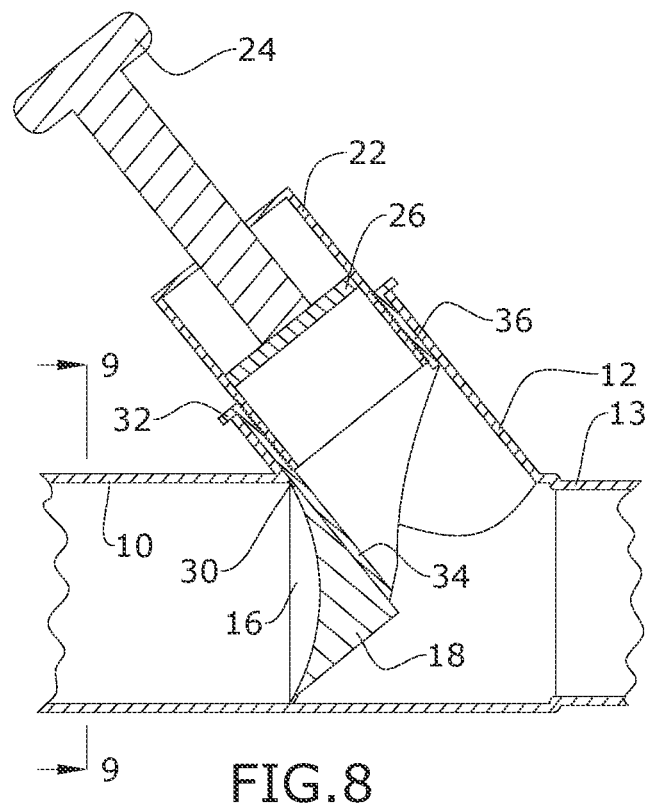
FIG. 8 is a section view of the embodiment of the present invention, taken along line 8-8 in FIG. 7.
Figure 9:
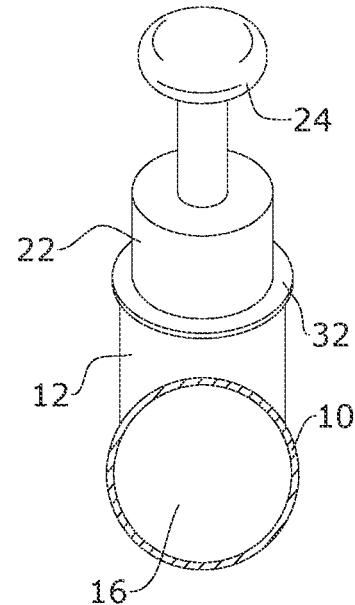
FIG. 9 is a section view of the embodiment of the present invention, taken along line 9-9 in FIG. 8.

A cover 16 is hung within the main body 10 and rotatable about a hinge 30, as shown in FIGS. 2 and 8, for example. In certain embodiments, the cover 16 may be embodied as a hard, round ribbon cover. In certain embodiments, the cover 16 may be removable for replacement or cleaning, as needed. In a normal state (e.g., FIG. 2), the cover 16 is configured to allow water/fluid flow from left to right. The cover 16 is configured to prevent backflow. In a scenario where fluid flow occurs from right to left, the cover 16 pivots downwardly to block a main opening of the main body 10 to prevent backflow from occurring, as shown, for example, in FIG. 6. The cover 16 has a projection 18 (that may be, for example, substantially triangular shaped when viewed from the side) coupled or integral therewith. The projection 18, when pressed, is configured to work in unison with the cover 16 to block the main body 10 and prevent fluid flow through the main body 10 (and the rest of the pipe system), as described in greater detail below.

Figure 3:
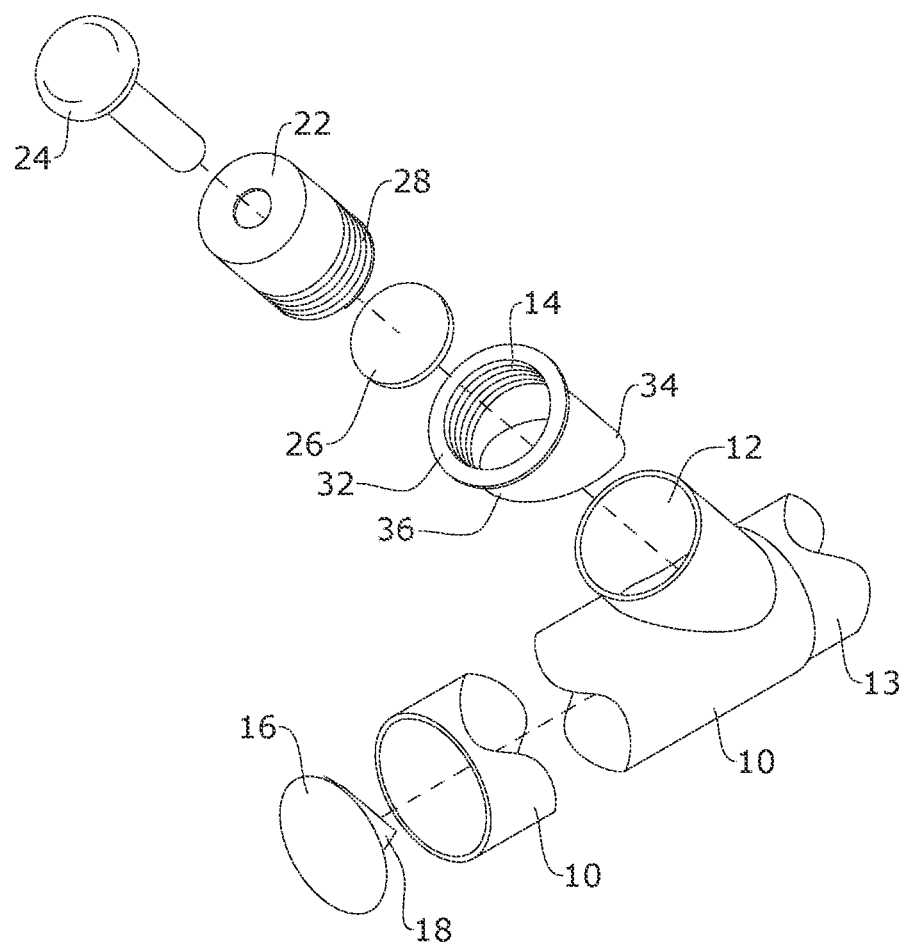
FIG. 3 is an exploded view of the embodiment of the present invention.
Figure 6:
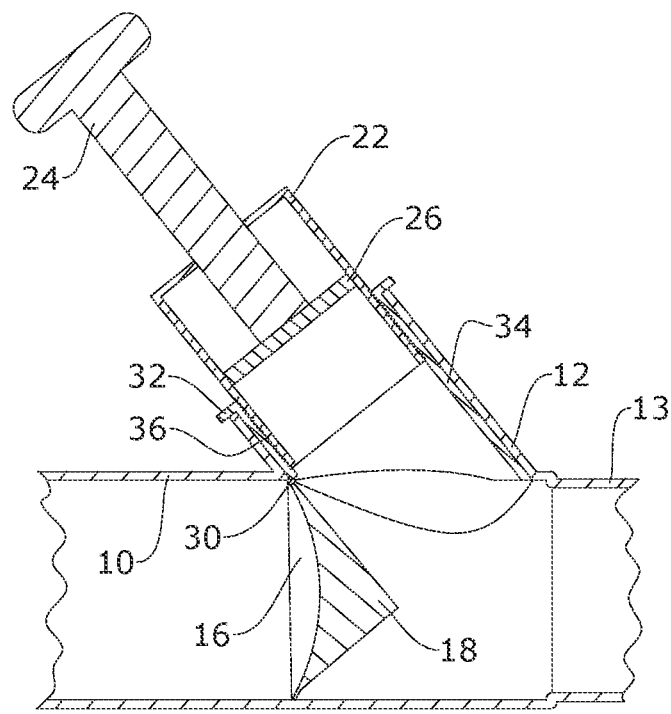
FIG. 6 is a section view of the invention, taken along line 6-6 in FIG. 5.
Figure 7:
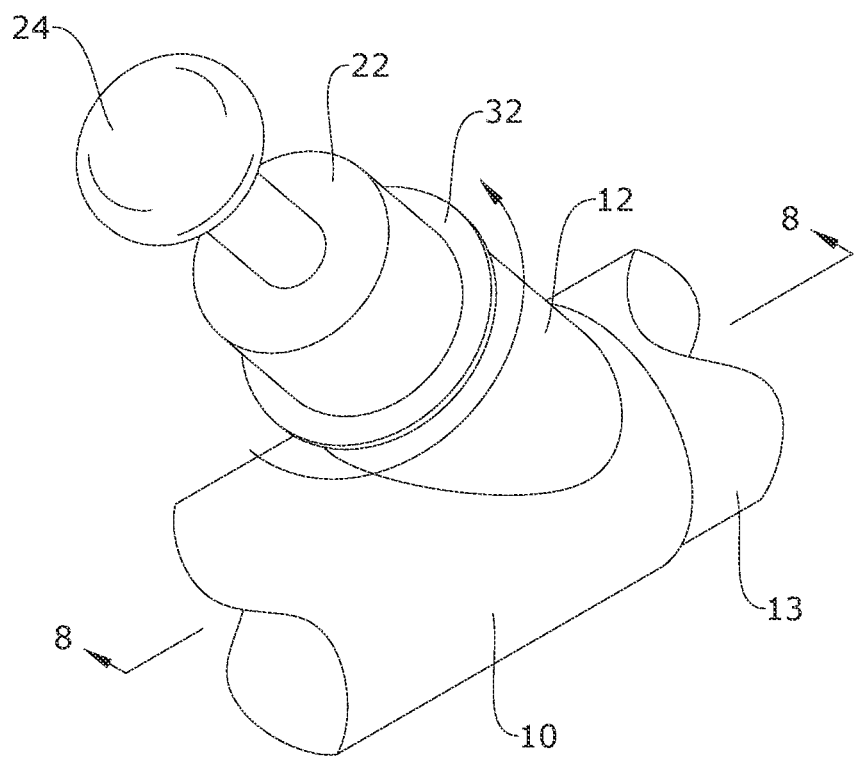
FIG. 7 is a perspective view of the embodiment of the present invention.

As shown in FIGS. 6 and 8, connecting pipe 32 is moveably coupled to the main body 10 via the branch/upper extension portion 12. The connecting pipe 32 is sized/configured to snugly fit with the branch portion 12 of the pipe and is rotatable therewithin, as discussed in greater detail below. The connecting pipe 32 defines a long side 34 and a short side 36. As shown in FIGS. 3 and 6, a top portion of the connecting pipe 32 may be provided with screw threads 14 for connecting with a plunger device (comprised of components 22, 24 and 26, discussed in greater detail below) such that the plunger device and plug 20 can be interchanged, as needed.

The plunger device, as shown in FIG. 3, is an independent part and functions to selectively create a pressurized chamber, as described in greater detail below. The plunger device includes a main body defining a housing 22, a handle 24, and a plunger 26. The housing 22 is coupled to the connecting pipe's screw threads 14 via its own screw threads 28. In certain embodiments, the housing 22 may be translucent. The plunger 26 is axially moveable via the handle 24, and is thus operably coupled to the branch portion 12 of the pipe. FIG. 3 is an exploded view showing the connecting pipe 32 and plunger device 22 (among other things) separated from the rest of the pipe unclogging device.

In use, the pipes of the pipe system are blocked/clogged, and the blockage is downstream of the device, a user can see the device is full of water due to the translucent material of this device. Further, a user may simply use the function of the plunger device to apply pressure to the blockage to force the blockage free in the following manner.

Normally (i.e., in day-to-day scenarios), the plunger device may be coupled to the connecting pipe 32 (or can be easily coupled thereto by screwing it on). When the pipes are blocked, if the blockage is downstream of the device, wastewater (or other fluid) will fill the pipes (including the main body 10 and upper extension portion 12), and the plunger 26 will be pushed upward due to fluid pressure, and the cover 16 will be pivoted upwards and visible due to the translucency of the material, resulting in easy detection of the clog. In this case, a user just needs to use the handle 24 to push down the plunger 26. When the user pulls the handle 24 up, water will flow in from the left side around the cover 16 due to the pressure differential and, when the user pushes the handle 24 down, water will flow to the right side, and does not flow back to the left side (due to the cover 16). At this time, the blocked location will receive high pressure from the water/fluid due to action of the plunger 26. That process can be repeated for a few minutes. If the blockage is not too bad, it should be cleared up quickly and easily, and no wastewater (or other fluid/odors) will escape the piping system.

Figure 4:
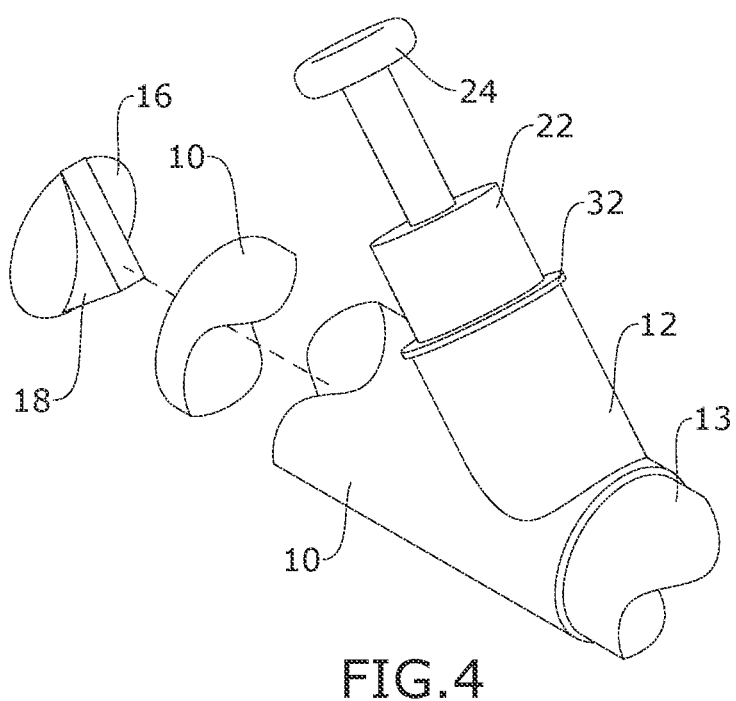
FIG. 4 is an exploded view of the embodiment of the present invention.
Figure 5:
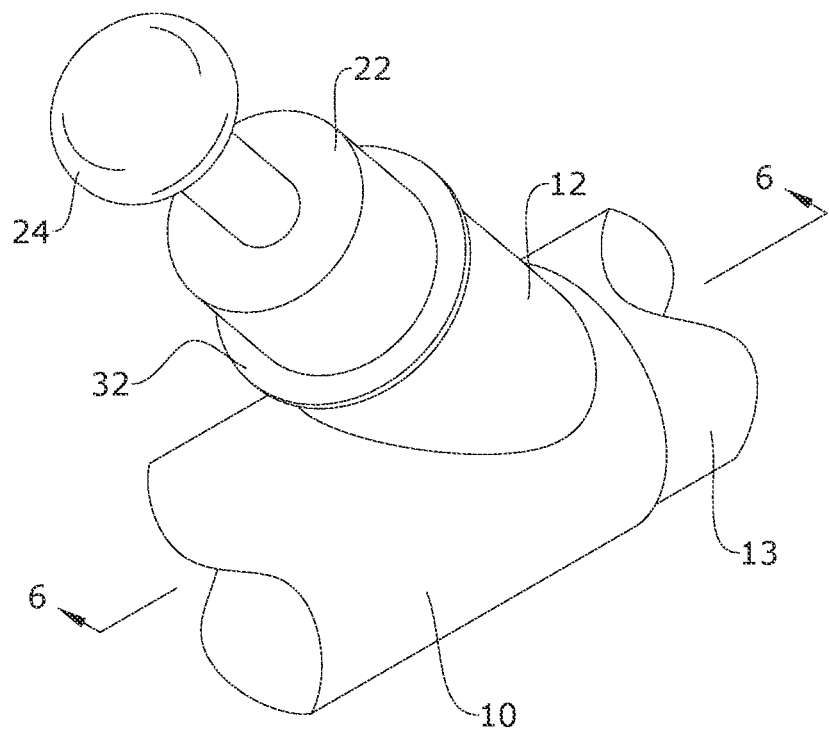
FIG. 5 is a perspective view of the embodiment of the present invention.

Further, the connecting pipe 32, as shown in FIGS. 3 and 4, has an exposed upper portion that extends from the upper extension portion 12 that is operable such that the connecting pipe 32 can be selectively rotated by a user. Because the upper extension portion 12 is provided at an angle, relative to the main body 10, in a first orientation (FIGS. 2 and 6), the connecting pipe 32 is retained in the upper extension portion 12 and does not engage the protrusion 18 (because the short side 36 is disposed proximal the protrusion 18). When the connecting pipe 32 is rotated 180 degrees from that first orientation, and as shown in FIG. 8, the long side 34 extends into the main body 10 and presses on the projection 18, thus forcing the cover 16 to remain in place blocking the main opening (where the fluid typically flows through) defined by the main body 10.

In cases of a very severe blockage in the pipes, and after the plunger device has been used as described above, the blockage can be unclogged in the following alternative manner. Those with skill in the art will appreciate that the above steps to unclog moderate blockages, as desired. In these scenarios, a user just needs to turn the connecting pipe 32 180 degrees, such that the cover 16 is pressed by the long side 34 of the connecting pipe 32, and the wastewater/fluid will thus be blocked by the cover 16 in the main body 10. The long side 34 of the connecting pipe 32 prevents the cover 16 from moving, in this position. Then, the user can remove the plunger device from the connecting pipe 32, with the connecting pipe 32 providing the user direct access to the pipe system (via a conduit in the branch portion 12). Consequently, the user can use other methods of unclogging the pipe, such as using a snake. As will be appreciated by those with skill in the art, the present invention can be installed at any point along a pipe system, allowing the user to unclog the pipe further down the line, as opposed to at the beginning of it (which is traditionally how the pipe would need to be unclogged).

In summary, the pipe unclogging device has multiple functions including, but not limited to: functioning as a backflow valve (cover 16); a blocker (cover 16 pressed by the connecting pipe 32); a sewer dredge (the plunger device); aid in determining location of blocked point in pipe (due to the transparency of the main body 10 and the plunger handle 24 being pushed upwards).

As will be appreciated by those with skill in the art from the foregoing, embodiments of the present invention may easily be made, and any factory who makes polyvinyl chloride (PVC) pipes can make it, in a similar manner as a Y-tube, but with the specific features described herein. The present invention is more complex than a conventional Y-tube, but compared with the cost of dredging the sewer, is a significantly cheaper and more convenient option in the long run. The plunger device, which is the most complex part, can be removed, and the whole sewer system only needs one, in certain embodiments (those with skill will appreciate multiple of these pipe unclogging devices can be used, as desired). To use, and as described above, when a user finds the device is full of wastewater, the user can make sure the blockage is downstream of the device, and the user just needs to push the plunger handle 24 exert a high pressure to the blockage. All that is used is water already in the pipes, which results in an easy and efficient process that also saves water and eliminates the need for clean up.

While one or more preferred embodiments are disclosed, many other implementations will occur to one of ordinary skill in the art and are all within the scope of the invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. Other arrangements, methods, modifications, and substitutions by one of ordinary skill in the art are therefore also considered to be within the scope of the present invention, which is not to be limited except by the claims that follow.

While apparatuses and methods are described in terms of "comprising," "containing," or "including" various components or steps, the apparatuses and methods can also "consist essentially of" or "consist of" the various components and steps. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted. Moreover, the use of directional terms such as above, below, upper, lower, upward, downward, left, right, and the like are used in relation to the illustrative embodiments as they are depicted in the figures, the upward or upper direction being toward the top of the corresponding figure and the downward or lower direction being toward the bottom of the corresponding figure.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. A pipe unclogging device comprising:
   a pipe comprising a main body and a branch portion extending in a partially transverse direction from the main body, the main body being configured to couple to a pipe system;
   a cover hingedly coupled to the pipe, the cover being rotatable between a first cover position wherein longitudinal fluid flow is obstructed through part of the main body, and a second cover position wherein longitudinal fluid flow is unobstructed through the main body;
   a plunger device operably coupled to the branch portion and actuatable to plunge fluid in the pipe; and
   a connecting pipe rotatably engaged with the branch portion, with the plunger device removably coupling to the connecting pipe.

2. The pipe unclogging device of claim 1, wherein at least a portion of the plunger device and at least a portion of the pipe is formed from a transparent or translucent material.

3. The pipe unclogging device of claim 1, wherein the cover, in the second cover position, is substantially disposed in the branch portion.

4. The pipe unclogging device of claim 1, wherein the plunger device is removable to selectively expose a conduit of the branch portion.

5. The pipe unclogging device of claim 1, further comprising a connecting pipe rotatably engaged with the branch portion, with the plunger device removably coupling to the connecting pipe.

6. The pipe unclogging device of claim 5, wherein the connecting pipe comprises a first side and a second side, the first side and the second side having differing lengths.

7. The pipe unclogging device of claim 6, wherein the connecting pipe is rotatable between a first connecting pipe position and a second connecting pipe position such that: in the first connecting pipe position, the first side of the connecting pipe engages the cover and, in the second connecting pipe position, neither the first side nor the second side of the connecting pipe engages the cover.

\* \* \* \* \*